United States Patent
Batzler et al.

(10) Patent No.: US 10,574,053 B2
(45) Date of Patent: *Feb. 25, 2020

(54) POWER MANAGEMENT TRANSFER SYSTEM AND METHOD

(71) Applicant: Briggs & Stratton Corporation, Wauwatosa, WI (US)

(72) Inventors: Brandon M. Batzler, Hartford, WI (US); Sie Teong Lim, Brookfield, WI (US); Todd Plichta, Germantown, WI (US); Nicholas Demos, Wauwatosa, WI (US); Brian Northway, Hartford, WI (US); Michael Miller, Lake Mills, WI (US)

(73) Assignee: Briggs & Stratton Corporation, Wauwatosa, WI (US)

( * ) Notice: Subject to any disclaimer, the term of this patent is extended or adjusted under 35 U.S.C. 154(b) by 144 days.

This patent is subject to a terminal disclaimer.

(21) Appl. No.: 15/861,148

(22) Filed: Jan. 3, 2018

(65) Prior Publication Data

US 2018/0131187 A1 May 10, 2018

Related U.S. Application Data

(63) Continuation of application No. 14/953,791, filed on Nov. 30, 2015, now Pat. No. 9,887,546.
(Continued)

(51) Int. Cl.
*H02J 3/14* (2006.01)

(52) U.S. Cl.
CPC ............. *H02J 3/14* (2013.01); *Y02B 70/3225* (2013.01); *Y04S 20/222* (2013.01)

(58) Field of Classification Search
CPC ....... H02J 3/14; Y02B 70/3225; Y04S 20/222
See application file for complete search history.

(56) References Cited

U.S. PATENT DOCUMENTS 7,471,505 B2   12/2008   Gull et al.
8,324,755 B2   12/2012   Stair et al.
(Continued)

OTHER PUBLICATIONS

Generac Smart Mangaement Module (SMM) Owner's/Installation Manual, 2015.
(Continued)

*Primary Examiner* — Robert L Deberadinis
(74) *Attorney, Agent, or Firm* — Foley & Lardner LLP

(57) ABSTRACT

A method and system for supplying electric power to a plurality of priority loads from either a utility power source or a secondary power source, such as a generator. A control unit monitors the power draw by each of a plurality of priority loads and base loads during the supply of electric power from the utility power source. When the supply of power from the utility power source is interrupted, the control unit determines the number of the priority loads that can be powered by the secondary power source based on the monitored power draw of the priority and base loads prior to power interruption. The secondary power source is activated and the determined number of priority loads is immediately connected to the secondary power source without delay. When the utility power source returns, the system and method transfers utility power back to all of the priority and base loads.

20 Claims, 3 Drawing Sheets

Related U.S. Application Data

(60) Provisional application No. 62/085,741, filed on Dec. 1, 2014.

(56) References Cited

U.S. PATENT DOCUMENTS

| | | |
|---|---|---|
| 8,410,633 B2 | 4/2013 | Batzler et al. |
| 8,415,830 B2 | 4/2013 | Lim et al. |
| 8,653,692 B2 | 2/2014 | Batzler et al. |
| 9,887,546 B2 * | 2/2018 | Batzler .................... H02J 3/14 |

OTHER PUBLICATIONS

Briggs & Stratton "100-150-200 Amp Automatic Transfer Switch" Installation Manual, 2013.

\* cited by examiner

POWER MANAGEMENT TRANSFER SYSTEM AND METHOD

CROSS-REFERENCE TO RELATED APPLICATION

The present application is a continuation of U.S. patent application Ser. No. 14/953,791, filed on Nov. 30, 2015 and issued as U.S. Pat. No. 9,887,546, which is based on and claims priority to U.S. Provisional Patent Application Ser. No. 62/085,741 filed Dec. 1, 2014, the disclosure of which is incorporated herein by reference.

BACKGROUND

The present disclosure generally relates to a power management system. More specifically, the present disclosure relates to a power management system that eliminates the delay in supplying power to priority loads from either a secondary power source, such as a standby generator, or a utility power supply after switching between the two power supplies.

When there is a power outage, backup power may be provided by a standby generator. In some cases, the standby generator is started automatically after detection of the power outage. A standby generator that is started automatically usually requires an automatic transfer switch to connect electrical loads to the generator rather than to the utility power supply. A combination of a standby generator and an automatic transfer switch is generally installed by trained personnel.

Since the power supplied by the standby generator is limited by the size of the generator, the amperage rating of the generator can limit the types of and number of appliances that are connected to the standby generator during power outages. As an example, large appliances such as air conditioners, hot water heaters and on-demand appliances such as microwave ovens and toasters can draw a significant amount of power that, in combination, may exceed the rating limit for the standby generator.

Presently, automatic transfer switches are available that include a series of priority circuits that allow the automatic transfer switch to selectively reduce the load on the generator when the load approaches the rated limit for the generator. Typically, the priority circuits are assigned a value from 1 to a maximum number, where the circuit assigned priority value 1 has the highest priority. When the load on the generator approaches the rating for the generator, a control unit in the transfer switch begins to manage the load by opening switches or relays within a remote contactor to disconnect the load connected to the lowest priority circuit. Although the term "remote contactor" is used in the present disclosure, the term "remote contactor" signifies any type of module, node or internal components included directly in a power consuming device that allows the disconnection of the device from the source of electrical power. The automatic transfer switch continues to manage the loads from the lowest priority circuit to the highest priority circuit until the load reaches a preset limit to ensure that the generator can continue to provide power to the highest priority loads connected to the generator (without the risk of overloading and shutting down the generator, thus inconveniencing the end user). When the load on the generator is reduced, load managing ceases.

During initial installation of the standby generator and automatic transfer switch, installers connect loads to each of the priority circuits based upon a perceived importance of each of the loads. As an example, an air conditioner may be assigned to priority circuit 1 where a less important load, such as a pool pump, may be assigned to priority circuit 3. Thus, when the total load on the generator nears the rating for the generator, the pool pump connected to priority circuit 3 is managed before the air conditioner connected to priority circuit 1. Currently available systems from Briggs & Stratton allows for reprioritization of loads without rewiring by an electrician. In such systems, the priority of the loads can be dynamically adjusted in a control unit depending on the preference of the end user. Other manufactures rely upon fixed, hard wire connections to the priority circuits, which may require trained personnel.

In currently available power management systems, when the supply of utility power is interrupted, the control unit in the transfer switch opens all of the relays or switches in the remote contactors to disconnect all of the managed loads from the power distribution network. Once the managed loads are disconnected, the transfer switch activates the standby generator. Once the standby generator begins operation, the control unit contained within the transfer switch waits for a delay period, often times up to five minutes, before beginning to reconnect the managed loads to the standby generator in the priority order. The delay in providing power to the managed loads is seen by many users as a disadvantage of the power management system described.

Likewise, when utility power returns to the power management system, the control unit in the transfer switch initially opens the relays within all of the remote contactors prior to switching over to power supplied by the utility. Once the switch in the transfer switch has been transferred to the utility power supply from the standby generator, the control unit again delays before reclosing the switches within the remote contactors in the priority order. Once again, this delay can be up to five minutes. During the delay, each of the managed loads are unavailable for use, which can create an inconvenience to the user.

SUMMARY

The present disclosure relates to a system and method that allows power to be provided to the priority loads immediately after transfer to a secondary power source, such as a standby generator. The system and method is able to accomplish this transfer by measuring, recording and calculating power consumption data during normal power supply from the utility to the base load and the priority loads to provide information on power demands for each priority load/appliance. The system of the present disclosure can then make a calculation on the base load (non-managed loads/appliances) that will have power immediately upon transfer and then calculate what managed priority loads can also have power immediately upon transfer to the secondary power source. This transfer can then be made without overloading the standby generator or creating a power management scenario where priority loads need to be managed due to their high power demands. The system of the present disclosure has the ability to continuously monitor and learn in real-time from the priority loads to ensure that the system has the most accurate data to make the right decisions regarding power management options. The present disclosure provides a competitive advantage because it allows for normalcy and immediate usage of the priority loads that are being managed. This feature provides a greater value to the end user by increasing the number of priority loads that can be used in a shorter amount of time following utility power loss.

The system and method of the present disclosure further eliminates the time delay before the priority loads come back online upon the retransfer back to utility power after utilizing a secondary power source. The elimination of the time delay after transferring back to utility power provides increased convenience and satisfaction to the end consumer since the end consumer does not have to wait any period of time to start using the priority loads that were being managed during supply from the secondary power source. The system and method of the present disclosure provides less inconvenience and more normalcy to the end user and the transition to the utility power supply is nearly immediate. Because the retransfer from the secondary power source back to the primary power source happens nearly simultaneously with the device switching, the end consumer may not realize that power has been retransferred to the utility. Providing an interruption free power solution for a power management system provides a competitive advantage over prior art systems.

The present disclosure relates to the ability of the power management system to obtain real measured data during utility use for the base loads and each priority load and know which of the priority loads can be switched on upon transfer to the secondary power source in addition to the base loads that were present at the time the utility power failed, all without overloading the secondary power source. The disclosure allows for a block of priority loads to receive power upon transfer to the secondary power source if possible while the remaining priority loads that were consuming power prior to the outage may be managed due to the total power exceeding the demand on the generator capacity. This calculation takes into consideration the priority allocated to each appliance/load and the algorithm then determines which group of loads can come on right away and which ones will need to be added one at a time. Other systems may only allow for the managed loads to be added one at a time and checking the load each time after it has been added to see how much power is available from the generator.

Various other features, objects and advantages of the invention will be made apparent from the following description taken together with the drawings.

BRIEF DESCRIPTION OF THE DRAWINGS

The drawings illustrate the best mode presently contemplated of carrying out the disclosure. In the drawings.

DETAILED DESCRIPTION

Figure 1:
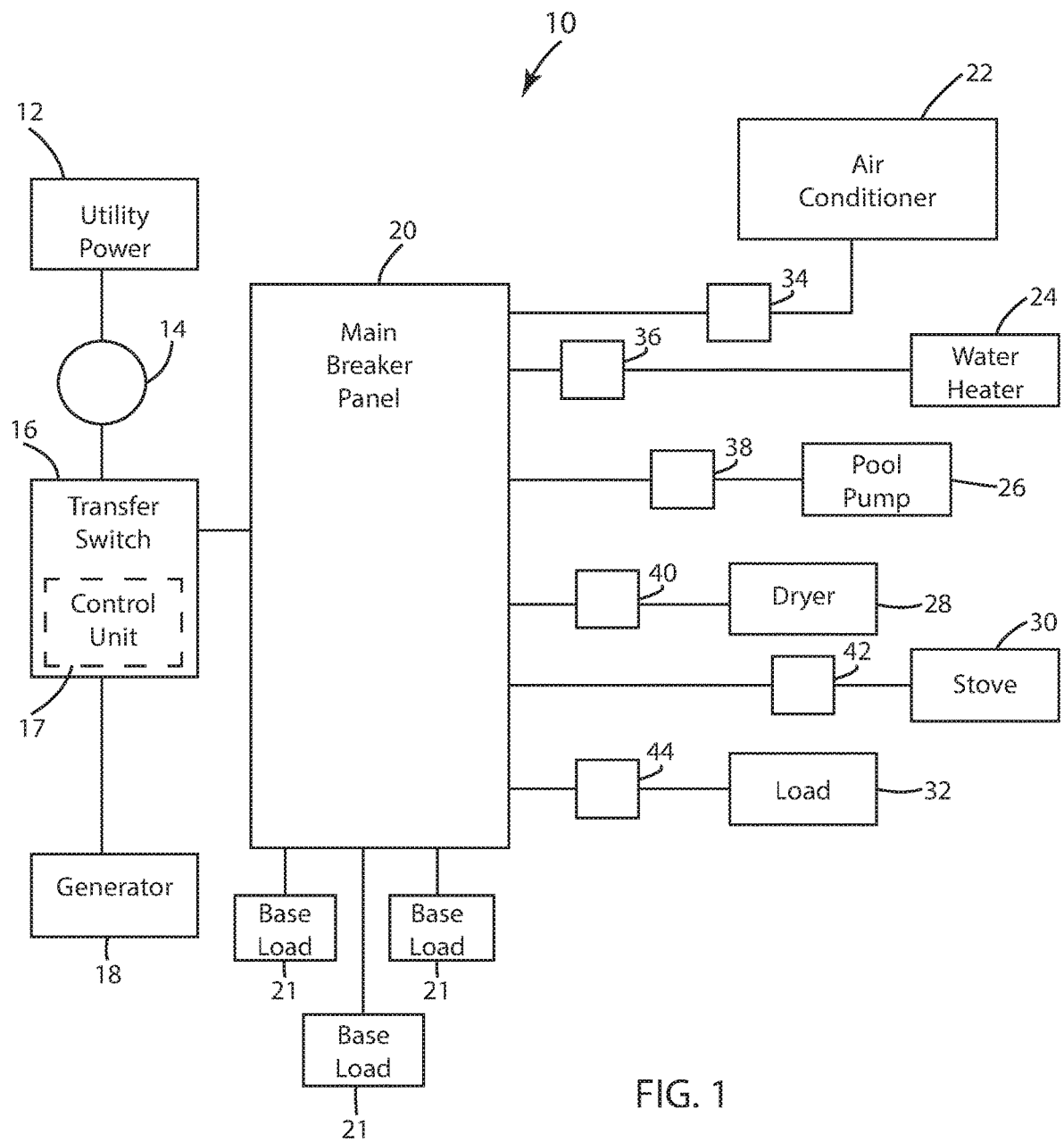
FIG. 1 is a schematic illustration of a power management system.

FIG. 1 illustrates a load management system 10. The load management system 10 includes a connection to a main power supply 12 through a utility meter 14. The power supply from the meter 14 is fed to a transfer switch 16. The transfer switch 16 includes a control unit 17 and is coupled to a secondary power source, which could be a solar power supply, wind turbine, fuel cell, battery or a standby generator. In the embodiment illustrated, the secondary power source is shown as a standby generator 18 and the transfer switch 16 includes the required switching components to provide power to the main breaker panel 20 depending upon the availability of the utility power 12. When the utility power 12 is available, electric power is supplied to the main breaker panel 20 through the transfer switch 16. If the utility power 12 becomes disconnected or unavailable, such as during a power outage, control unit 17 in the transfer switch 16 detects the power loss, activates the generator 18 and changes the position of an internal switch to provide the electric power from the generator 18 to the main breaker panel 20.

The main breaker panel 20 is connected to all power consuming loads within a home or business. The main breaker panel 20 includes a series of circuit breakers that provide the supply of electric power to multiple base loads 21 from either the utility power source 12 or the generator 18. In the illustration of FIG. 1, three separate base loads 21 are illustrated coupled to the main breaker panel 20. It should be understood that a larger number of base loads 21 or a smaller number of base loads 21 could be connected to the main panel 20. As will be discussed below, the base loads 21 are connected directly to the main breaker panel and are not managed by the transfer switch 16.

In the embodiments shown in FIG. 1, power is supplied from the main breaker panel 20 to a series of managed priority loads. In the embodiment shown in FIG. 1, the managed priority loads include an air conditioner 22, a water heater 24, a pool pump 26, a dryer 28, a stove 30, as well as other electric loads generally illustrated by reference numeral 32.

The control unit 17 contained within the transfer switch 16 controls the supply of power from the standby generator 18 to the plurality of priority loads through a series of remote contactors. Although the term remote contactor is used in the present disclosure, the term "remote contactor" signifies any type of module, node or components that allows the disconnection of the device from the source of electrical power. The remote contactor may be a separate component or included directly in the power consuming device of the breaker panel 20.

As illustrated in FIG. 1, a remote contactor 34 is associated with the air conditioner, a remote contactor 36 is associated with the water heater, a remote contactor 38 is associated with the pool pump, a remote contactor 40 is associated with the dryer, a remote contactor 42 is associated with the stove and a remote contactor 44 is associated with the auxiliary load 32. Each of the remote contactor 34-44 includes a relay circuit that can be selectively opened or closed by a command from a controller, such as the transfer switch control unit 17, to selectively allow power to reach the respective electric load. The controller could be located in other devices or components.

During initial setup of the transfer switch 16, information needs to be entered into the transfer switch control unit 17 with respect to the standby generator 18 and each of the remote contactors 34. This information includes the rating and capacity of the generator 18, the MAC ID of the contactor, an installation code associated with the contactor, the model number of the contactor, the serial number of the contactor and a passcode associated with the contactor. Since the transfer switch 16 communicates to each of the remote contactors separately, this information must be entered for each of the remote contactors separately, as well as from the generator 18. The communication to the remote contactors can occur using many different techniques, such as PLC, wireless or other communication protocols or techniques.

Figure 2:
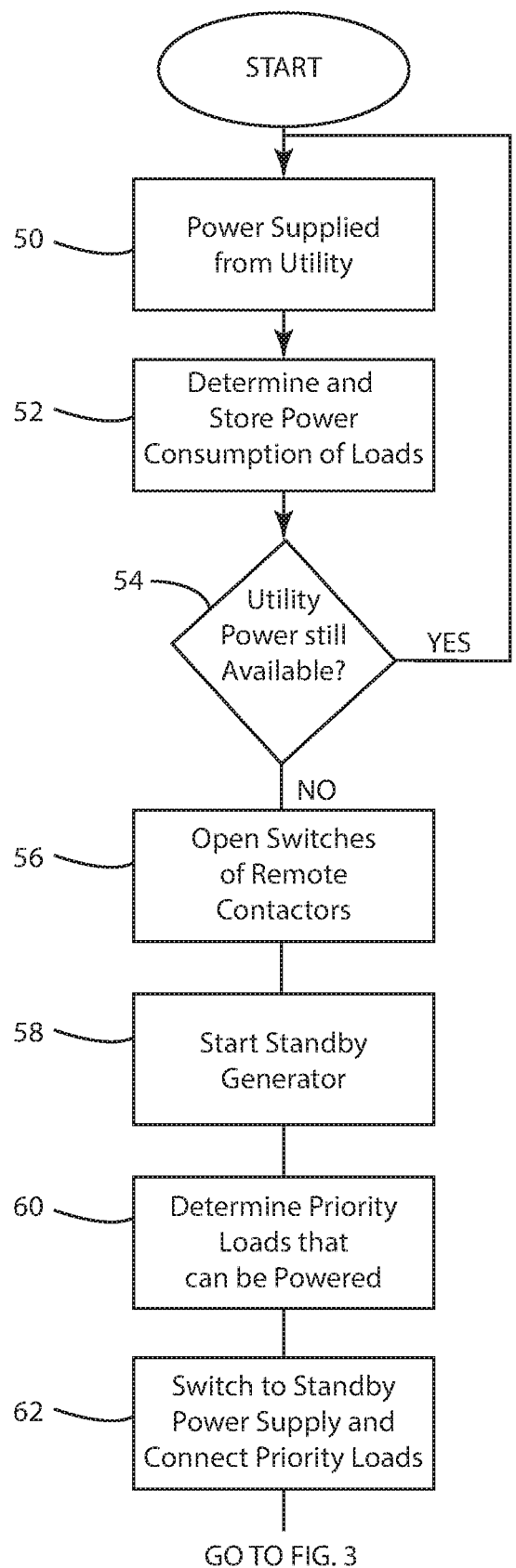
FIG. 2 is a flow chart illustrating one possible operational sequence carried out by the control unit of the transfer switch

Referring now to FIG. 2, when power is being supplied from the utility, as shown in step 50, the control unit of the transfer switch closes the internal contacts within each of the remote contactors 34-44 to supply electric power to each of the priority loads. Since the supply of utility power is in excess of the loads at a home or business and is controlled or set by the utility provider, the transfer switch control unit allows power to be supplied to all of the priority loads.

During operation of each of the priority loads while on utility power, the control unit 17 contained within the transfer switch determines the amount of power that is being drawn by each of the priority loads and stores this power consumption information within a memory location within the transfer switch 16. It is contemplated that the control unit 17 contained within the transfer switch 16 will be able to monitor the amount of current drawn by each of the priority loads, both on utility and secondary power, to make a power calculation for each of the priority loads. The determination of the power draw is updated continuously within the control unit of the transfer switch.

In addition to continuously storing the power draw from each of the priority loads, the control unit contained within the transfer switch is able to also store a normal, average power draw for each of the priority loads when the priority load is activated. As an example, the water heater 24 may not be drawing power at a given time but the control unit would store information as to the normal power draw of the water heater 24 during its operation.

In addition to monitoring the amount of power drawn by each of the plurality of priority loads, the control unit also monitors the power draw by the base loads 21 within the home or business. The base loads represent all of the power consuming devices located within the home that are not assigned to one of the priority circuits. In the embodiments shown in FIG. 1, the largest power consuming devices are all connected to one of the remote contactors 34-44 and represent a large majority of the power drawn within a home. The base loads, which can include lights, small appliances, electronics and similar devices, draw an amount of power that is stored by the control unit in step 52.

Once the power draw has been stored in step 52 for the base loads and the priority loads, the control unit of the transfer switch moves to step 54 to determine whether utility power is still available. If utility power is still available, the system returns to step 50 and continues to monitor the amount of power drawn by each of the priority loads and base loads in step 52. This process continues until the control unit determines in step 54 that utility power has been lost.

Once utility power is lost, the system moves to step 56. Once the utility power has been lost, the control unit within the transfer switch initially opens the contacts or switches in each of the remote contractors 34-44. Since the utility power supply has been lost, a home owner will not separately detect the disconnections of the priority loads during this action by the transfer switch control unit. Each of the remote contactors 34-44 is initially opened such that a return of power will not create a voltage or current spike at the priority load.

Once each of the switched of the remote contactors opens, the transfer switch control unit starts the standby generator as illustrated in step 58. Since utility power has been lost, starting the standby generator in step 58 will allow the transfer switch to supply power back to the base loads and selected priority loads based on the previous recorded data and calculations made by the control unit 17. The control unit 17 reviews a snapshot of the power demand on the entire system just prior to the power outage to determine how much power will be required upon transfer to the secondary power source.

Immediately after starting the standby generator, the control unit of the transfer switch determines in step 60 which of the priority loads can be activated and supplied with power from the standby generator along with the unswitched base loads. Typically, the standby generator is rated to operate within approximately 85% of the maximum rating for the generator. Thus, the transfer switch control unit may not activate all of the remote contactors 34-44 depending upon the combined load of the priority circuits immediately before the utility power was lost.

As discussed above, the control unit continuously monitors the amount of power drawn by the base loads and each of the priority loads when the priority loads were being supplied with power from the utility power source prior to interruption of the utility power supply. Since the control unit knows the amount of power drawn by the base loads and the combination of the priority loads, the control unit determines in step 60 which of the priority loads can be powered by the standby generator based on the priority designation for the priority loads. For example, if the control unit determines that the air conditioner, water heater and pool pump (priority designations 1, 2 and 3) can all be supported by the standby generator but the dryer and stove (priority designations 4 and 5) cannot be supported, the control unit will activate only the remote contactors 34, 36 and 38.

Since the control unit knows the actual load being drawn by the air conditioner, water heater and pool pump immediately before utility power was disrupted, the system can predict the power draw upon closing the contacts to the loads and immediately close the contacts in the remote contactors 34, 36 and 38 to supply power to the air conditioner, water heater and pool pump after starting the standby generator in step 58. Unlike prior systems that incorporated a delay of up to five minutes between starting the standby generator and supplying power to the first priority load, the system and method described in FIG. 2 supplies the standby power to all of the selected priority loads nearly simultaneously after switching to the power supplied by the standby generator.

In prior art load management systems, the transfer switch control unit would typically start operation of the standby generator and switch over to standby power while all of the remote contactor remained in the open position. After switching to standby power, the control unit of the transfer switch would initiate a timer and wait for a delay of up to five minutes before activating the first priority circuit. The control unit of the standby generator would then monitor the power draw of the first priority circuit to determine whether the second priority circuit could be supplied with power from the standby generator. This determination process could also last between thirty seconds to a minute. If a sufficient amount of power was available, the system would then activate the second priority circuit and subsequently wait to determine whether the third priority circuit could be activated. This process would continue until either all of the priority circuits were supplied with standby power or upon a determination that the amount of power being drawn by the priority circuits approached the generator rating. Thus, there may be a delay of up to ten minutes from activation of the standby generator until electric power is supplied to one of the lower priority circuits.

In the system and method described in FIG. 2, the control unit of the transfer switch immediately transfers power to as many priority circuits as possible once the standby generator has been activated and is switched into its power providing position. This automatic switching of the priority loads is made possible by step 52 in which the power consumption of the base loads and each of the priority loads is stored immediately prior to loss of utility power.

Figure 3:
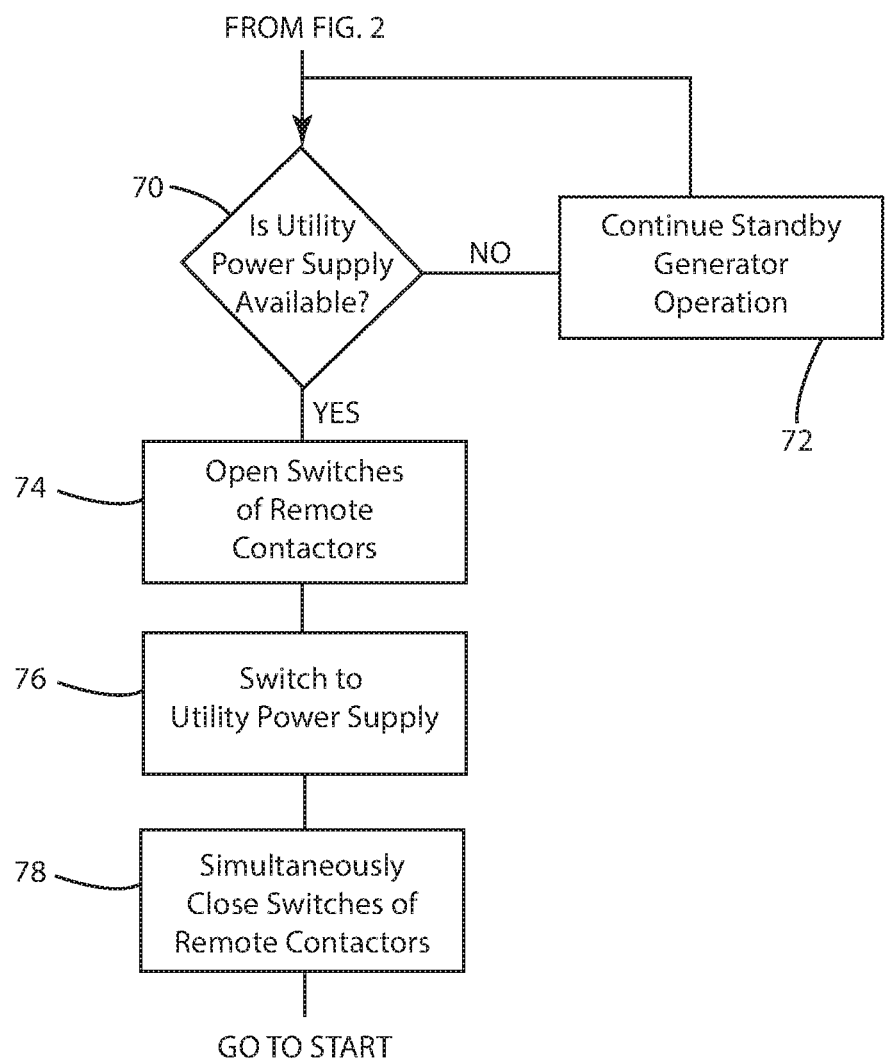
FIG. 3 is a second operational sequence carried out by the control unit of the transfer switch.

Referring now to FIG. 3, once the transfer switch has transferred power to the standby generator, the control unit may be operated in many different ways to actively manage loads and reconnect loads based upon the power draw on the standby generator and the allocated priority values for each of the loads. As an example, the power management system can be operated in accordance with the method and systems described in the applicant's own U.S. Pat. Nos. 8,410,633 and 8,415,830, the disclosures of which are incorporated herein by reference. In each of these two operational systems, the transfer switch control unit sheds loads and reconnects loads based upon the power draw on the standby generator and the rating for the standby generator. For example, after switching to the secondary power supply and initially connecting the priority loads that can be supported based on the known power consumption prior to the utility power loss, the control unit will continue to monitor the actual power draw and will determine if the next highest priority load can be powered that was not already powered. This process continues until all of the priority loads are powered or until the secondary power source reaches the maximum allowable capacity.

As illustrated in FIG. 3, the control unit continues to monitor whether the utility power supply is available, as illustrated by step 70. If the utility power supply is not available, the system continues to operate the standby generator in step 72 and supply power from the standby generator. However, if the system determines in step 70 that the utility power supply is available, the control unit of the transfer switch opens each of the switches in the remote contactors 34-44, as illustrated in step 74. As described above, opening each of the switches in the remote contactors ensures that a surge of current and voltage is not seen during the switching over between the standby generator and the utility power supply.

Once the remote contactors have been opened, the transfer switch control unit closes the internal contacts within the transfer switch to switch over to the utility power supply, as shown in step 76. Immediately after power has been transferred back to the utility power supply, the control unit simultaneously closes all of the switches in the remote contactors 34-44 that feed the priority loads, as shown in step 78. Thus, once the utility power supply has been reconnected to the main breaker panel, the control unit of the transfer switch immediately closes the switches within the remote contactors such that a user does not notice a power disruption for more than a moment.

In prior power management systems, the control unit contained within the transfer switch will delay for a period of up to five minutes prior to closing the contacts within the remote contactors. In such a system, a home owner would experience a period of power loss to each of the priority loads, even though the utility power has returned. Such a delay has been found to be unacceptable to many homeowners. Thus, the system and method described in FIGS. 2 and 3 eliminates the delay between the switching from the utility power supply to the standby generator and the reconnection of the utility power supply.

This written description uses examples to disclose the invention, including the best mode, and also to enable any person skilled in the art to make and use the invention. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

We claim:

1. A method of managing the supply of electric power from a utility power source or a secondary power source to a plurality of priority loads that are each connected to a switching device and a plurality of base loads, the method comprising the steps of:

monitoring the power draw from each of the priority loads in a control unit during the supply of electric power from the utility power source;

monitoring for the presence of the supply of electric power from the utility power source; upon detecting a loss of the utility power source, selectively opening one or more of the switching devices;

determining in the control unit the number of priority loads that can be powered by the secondary power source;

activating the secondary power source and closing the switching devices to the determined number of priority loads to supply electric power to the determined number of priority loads upon activation of the secondary power source.

2. The method of claim 1 further comprising the steps of:

monitoring the power draw of each of the base loads in the control unit during the supply of electric power from the utility power source; and determining the number of priority loads that can be powered by the secondary power source based in part on the combined power draw of the monitored base loads.

3. The method of claim 1 wherein the determined number of priority loads that can be powered by the secondary power source is based on the monitored power draw of the priority loads at a time before the loss of the utility power source.

4. The method of claim 1 wherein the secondary power source is a generator.

5. The method of claim 1 wherein the control unit is contained in a transfer switch panel having a transfer switch connected to both the utility power source and the secondary power source.

6. The method of claim 5 further comprising the step of moving the transfer switch to connect the secondary power source to the base loads and the priority loads prior to activating the secondary power source.

7. The method of claim 1 further comprising the step of assigning a priority value to each of the priority loads in the control unit, wherein the control unit determines the number of priority loads that can be powered by the secondary power source based on the monitored power draw of each of the priority loads and the priority value assigned to each of the priority loads.

8. The method of claim 1 further comprising the steps of:

monitoring for the return of the supply of electric power from the utility power source;

upon detecting the return of electric power from the utility power source, opening each of the switching devices; terminating the operation of the secondary power sources; and supplying the utility power source to the base loads and selectively closing each of the switching devices to supply the utility power source to the priority loads.

9. A system for managing the supply of power to a plurality of base loads and a plurality of priority loads from either a utility power source or a secondary power source, comprising:

a transfer switch coupled to the utility power source and the secondary power source;

a switching device connected to each of the plurality of priority loads, each of the switching devices being movable between an open and a closed position to control the supply of electric power to the priority load;

a control unit operable to control the position of the transfer switch and the state of each of the switching devices, wherein the control unit is configured to:

monitor the power draw from each of the priority loads during the supply of electric power from the utility power source;

monitor for the presence of the supply of electric power from the utility power source; upon detecting a loss of the utility power source, open each of the switching devices; determine the number of priority loads that can be powered by the secondary power source; and activate the secondary power source and selectively close the switching devices to the determined number of priority loads to supply electric power to the determined number of priority loads upon activation of the secondary power source.

10. The system of claim 9 wherein the control unit is further configured to: monitor the power draw of each of the base loads in the control unit during the supply of electric power from the utility power source; and determine the number of priority loads that can be powered by the secondary power source based in part on the combined power draw of the monitored base loads.

11. The system of claim 9 wherein the determined number of priority loads that can be powered by the secondary power source is based on the monitored power draw of the priority loads at a time before the loss of the utility power source.

12. The system of claim 9 wherein the secondary power source is a generator.

13. The system of claim 9 wherein the control unit is contained in a transfer switch panel including the transfer switch.

14. The system of claim 9 wherein a priority value is assigned to each of the priority loads in the control unit, wherein the control unit is configured to determine the number of priority loads that can be powered by the secondary power source based on the monitored power draw of each of the priority loads and the priority value assigned to each of the priority loads.

15. A method of managing the supply of electric power from a utility power source or a secondary power source to a plurality of priority loads that are each connected to a switching device and a plurality of base loads, the method comprising the steps of:

monitoring the power draw from each of the priority loads and each of the base loads in a control unit during the supply of electric power from the utility power source;

upon detecting a loss of the utility power source, selectively opening the switching devices;

determining in the control unit the number of priority loads that can be powered by the secondary power source in addition to the base loads;

activating the secondary power source and closing the switching devices to the determined number of priority loads to supply electric power to the determined number of priority loads and the base loads upon activation of the secondary power source.

16. The method of claim 15 wherein the determined number of priority loads that can be powered by the secondary power source is based on the monitored power draw of the priority loads and the base loads at a time before the loss of the utility power source.

17. The method of claim 15 wherein the control unit is contained in a transfer switch panel having a transfer switch connected to both the utility power source and the secondary power source.

18. The method of claim 17 further comprising the step of moving the transfer switch to connect the secondary power source to the base loads and the priority loads prior to activating the secondary power source.

19. The method of claim 15 further comprising the step of assigning a priority value to each of the priority loads in the control unit, wherein the control unit determines the number of priority loads that can be powered by the secondary power source based on the monitored power draw of each of the priority loads and the priority value assigned to each of the priority loads.

20. The method of claim 15 further comprising the steps of:

monitoring for the return of the supply of electric power from the utility power source;

upon detecting the return of electric power from the utility power source, opening each of the switching devices;

terminating the operation of the secondary power sources; and supplying the utility power source to the base loads and closing each of the switching devices to supply the utility power source to the priority loads.

* * * * *